United States Patent [19]

Lippacher et al.

[11] Patent Number: 4,824,298
[45] Date of Patent: Apr. 25, 1989

[54] HAND-HELD TOOL WITH DETACHABLE TOOL BIT CHUCK

[75] Inventors: Wolfgang Lippacher, Herrsching; Reinhard Riedl, Grossenzemoos, both of Fed. Rep. of Germany

[73] Assignee: Hilti Aktiengesellschaft, Schaan, Liechtenstein

[21] Appl. No.: 112,743

[22] Filed: Oct. 22, 1987

[30] Foreign Application Priority Data

Oct. 23, 1986 [DE] Fed. Rep. of Germany ....... 3636027

[51] Int. Cl.⁴ .................... B23B 31/04; B25D 17/08
[52] U.S. Cl. ........................... 408/240; 173/48; 279/1 B; 279/19.3; 279/62; 279/72
[58] Field of Search ............... 408/239 R, 239 A, 240; 279/1 B, 72, 60, 61, 62, 63, 64, 65, 19.3, 19.4; 173/47, 48

[56] References Cited

U.S. PATENT DOCUMENTS 3,116,068 12/1963 Pfister et al. .......................... 279/72
4,592,560 6/1986 Neumaier et al. ..................... 279/81
4,621,820 1/1986 Rohm ................................. 279/1 B Primary Examiner—Z. R. Bilinsky
Attorney, Agent, or Firm—Toren, McGeady & Associates

[57] ABSTRACT

A hand-held tool for use as a powered drill or screw driver, has a chuck for holding a tool bit, and the chuck is replaceable without employing another tool. A conically shaped shaft section on a rotary spindle fits into a conically shaped bore in a socket section of a part of the chuck. The shaft section and chuck part are secured together by clamping members held in place by a spring. The interconnection affords concentricity and true runout. The rotary spindle is provided with a recess or groove in its outer surface. The groove has an inclined flank closer to the front end of the spindle and the clamping members is biased by the spring against the flank. The spring is displaceable by a gripping sleeve between the biasing position and a released position.

10 Claims, 2 Drawing Sheets

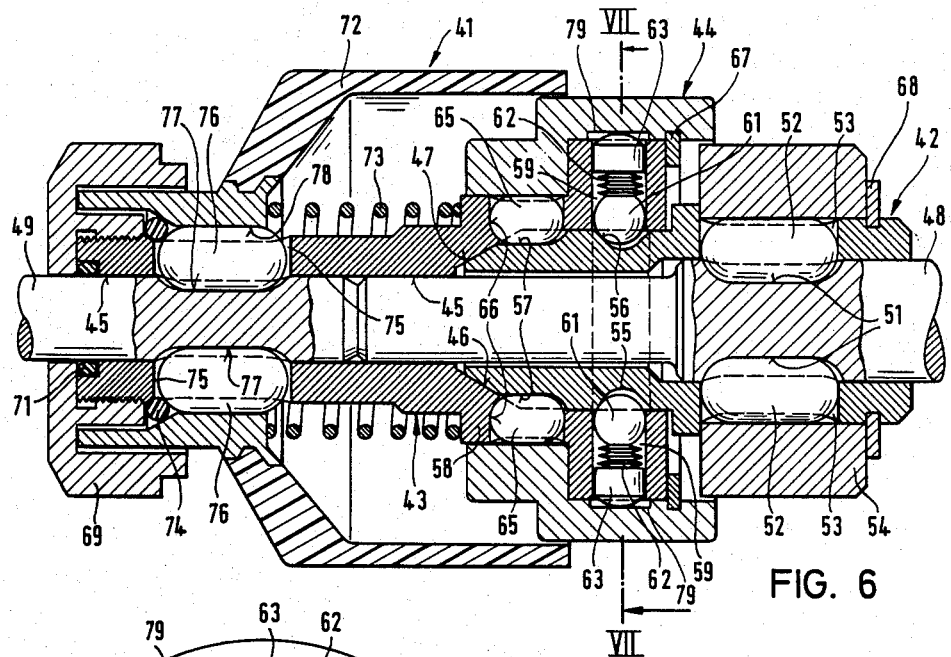
FIG. 6
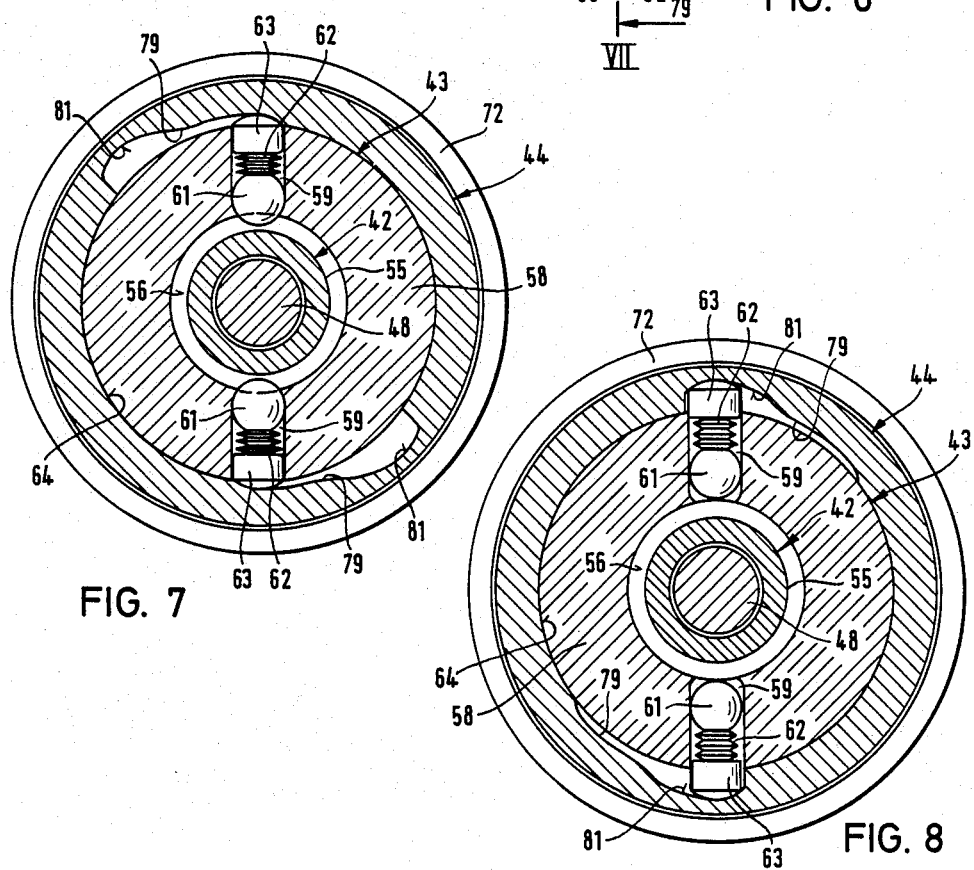
FIG. 7
FIG. 8

HAND-HELD TOOL WITH DETACHABLE TOOL BIT CHUCK

BACKGROUND OF THE INVENTION

The present invention is directed to a hand-held tool for use as a hammer drill, a powered drill or screw driver and the like and has a detachable chuck, for holding tool bits, secured on a rotary spindle. The chuck has a chuck part in inter-engagement with the rotary spindle with a front end part of the spindle located within a socket-shaped section of the chuck part. The chuck is connected with the rotary spindle so that it can be locked for rotation with the spindle.

In hand-held tools of the above type, it is frequently necessary to use the functional mode of one type of tool in another type of tool. For instance, relatively often the striking action of a hammer drill can be switched off and the hammer drill used as a regular drilling tool. To clamp the tool bit required for such conversion, the hammer drill must have a suitable drill chuck which, as a rule, is effected by providing a chuck with an insertion end arranged to receive the hammer drill.

Such retooling involves the disadvantage that the runout and concentricity of the clamped tool bit cannot be assured and, in addition, the transmittal of torque and percussive force occurs with play or backlash. Moreover, the known hand-held tools have a large over-all length.

It was found impractical to replace the entire chuck instead of so-called adapter solutions, since no solution was known to permit the exchange without involving a high expenditure of time and tooling. For instance, the tool chuck disclosed in DE-OS No. 33 10 371 can be detached from the rotary spindle of the hand-held tool only with special effort requiring additional tools. In the known tool chuck, a set screw has to be loosened by a tool and then an adjusting ring must be moved to a specific location whereby the clamping member releases the connection between the chuck and the rotary spindle. In addition, the connection between the chuck and the rotary spindle disclosed in the above patent publication requires a relatively large guidance region for guiding the chuck on the rotary spindle to assure adequate run-out and concentricity.

SUMMARY OF THE INVENTION

Therefore, the primary object of the present invention is to provide a hand-held tool with a chuck capable of being replaced without any additional tools, and where the connection between the chuck and the rotary spindle assures concentricity and the required runout while affording a short overall length.

In accordance with the present invention, a socket-shaped section on the chuck and a front end part of the rotary spindle each have corresponding axially extending conically shaped surfaces which engage with one another. The engaging surfaces are a conically-shaped shaft section and a conically-shaped bore. A recess is formed in an outer surface of the spindle and the recess has a base inwardly of the outer surface face shorter in the axial direction of the spindle than the opening into the recess. Further, the recess has a flank closer to the front end of the spindle inclined from the opening of the recess to the base in the direction toward the rear end of the spindle. A clamping member is located in a radially extending through opening in the socket-shaped section and extends into the recess in the spindle surface. A spring member in engagement with the clamping member holds the clamping member in the recess in engagement with the spindle. A gripping means in contact with the spring member displaces the clamping member into and out of engagement with the recess. The dimension of the clamping member within the recess in the direction of the axis of rotation of the spindle corresponds at most to the least dimension of the recess in the same direction.

Connecting the chuck to the rotary spindle by axially extending conically-shaped support surfaces on the chuck and the spindle provides a concentric engagement free of play assuring concentricity as well as true runout. The over-all length of the tool can be kept small, since the length is governed by the axial dimension of the conically shaped surfaces. To facilitate the disengagement of the support surfaces, the cone angle of the surfaces is located outside of the self-blocking range and is in the range of approximately 25° to 35°. The conically-shaped support surfaces are formed by a conically-shaped shaft section inserted into a conically-shaped bore. Preferably, the shaft section is located on the rotary spindle and the conically shaped bore is located in the chuck.

Advantageously, several clamping members arranged uniformly in a circumferential direction of the chuck are guided in through openings in the chuck and afford backlash-free interengagement of the conically-shaped shaft section in the conically-shaped bore. The clamping members are pressed or biased inwardly by a spring against an inclined flank of the recess in the spindle with the recess located adjacent to the front end of the spindle. The stressing action of the spring is afforded by an external gripping or handling means. The inclined flank formed in the recess formed in the spindle is inclined at an angle of about 45° to the axis of rotation of the spindle. Because the clamping member abuts against the flank, it does not come in contact with the base of the recess and thus afford an axial force component which provides backlash-free interengagement of the conically-shaped support surfaces. Plural clamping members afford the axial retention of the chuck on the rotary spindle with the transmission of rotational movement being provided by separate and preferable positively locked transmission means, such as interengaged splined surfaces.

It is advantageous to arrange the recess as a circumferentially extending annular groove to facilitate the entry of the clamping members. It is easy to fabricate an annular groove and simplify the connection of the chuck with the rotary spindle, since the chuck can be placed on the spindle in any desired rotational position so that the clamping members can move inwardly into the annular groove independently of the rotational position.

For reasons of simplicity, the clamping members are in the form of balls. Such balls are not only cost effective mass production articles, but further are distinguished by simple functioning and installation because of their shape.

The spring acts on the clamping members in the radial direction to utilize the entire biasing action of the spring without losses through redirection for engagement of the clamping members. Accordingly, it is possible to prevent any jamming effect.

In a preferred embodiment, the spring is formed as an annular member acting on the outer surfaces of the clamping members with the inner side of the spring being prestressed against the socket-shaped section of the chuck for displacing the clamping members inwardly into the annular groove.

It is advantageous if the annular spring is polygonal with the number of corners of the polygonally-shaped spring corresponding to the number of the clamping members. Depending upon the rotational position of the annular spring, the individual side surfaces or corners of the spring can be located opposite the clamping members. The side surfaces of the annular spring rest in a curved manner under prestress at the outer surface of the socket-shaped section of the chuck. With such an arrangement, the clamping members are shifted by the side surfaces of the spring at an appropriate rotational position into the groove. By rotation of the annular spring its corners are moved opposite and are radially spaced from the outer surface of the socket-shaped section into register with the clamping members so that the clamping members can move outwardly into the corners becoming disengaged from the groove. In this position, the chuck can be pulled axially off the rotary spindle without the requirement of any significant force.

In another embodiment, the spring acting on the clamping members is in the form of a cup spring package. A gripping or handling sleeve, rotatable relative to the chuck member, is preferred for actuating the spring. The annular spring can be fixed axially on one side and nonrotatably relative to the gripping sleeve. The axially exposed segment of the spring acts on the clamping members. If cup spring packages supported in the through openings are used, the cup spring packages are actuated by means of a sliding shoe in contact with the radially inner surface of the gripping sleeve.

In one embodiment of the invention, the inner surface of the gripping sleeve contains recesses or depressions corresponding to the number of clamping members. In the circumferential direction, a portion of the depressions are of an increased depth. In the rotational position of the gripping sleeve when the increased depth of the depressions are not located radially opposite the clamping members, the surface of the depressions presses the cup spring packages radially inwardly and biases the clamping members into the groove in the rotary spindle affording the desired backlash-free clamping of the conically-shaped support surfaces on the chuck and the rotary spindle. By an angular displacement via the gripping sleeve with the increased depth section of the depressions being located opposite the cup spring packages, the cup spring packages are released rebounding outwardly and the clamping members can then disengage from the groove permitting the chuck to be removed.

Snap-in means can be provided for locking the gripping sleeve in its different positions. Such snap-in means can be in the form of spring biased balls, supported radially displaceably in the gripping sleeve for movement into snap-in openings in the outer surface of the chuck. Further, blocking means limiting the turning of the gripping sleeve from one position to the other can be provided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 6 is an axially extending sectional view of another embodiment of the tool bit chuck clamped to the rotating spindle of the present invention;

FIG. 7 is a sectional view taken along the line VII—VII in FIG. 6; and

FIG. 8 is a sectional view, similar to FIG. 7, however, showing the chuck released from the rotary spindle.

DETAILED DESCRIPTION OF THE INVENTION

Figure 1:
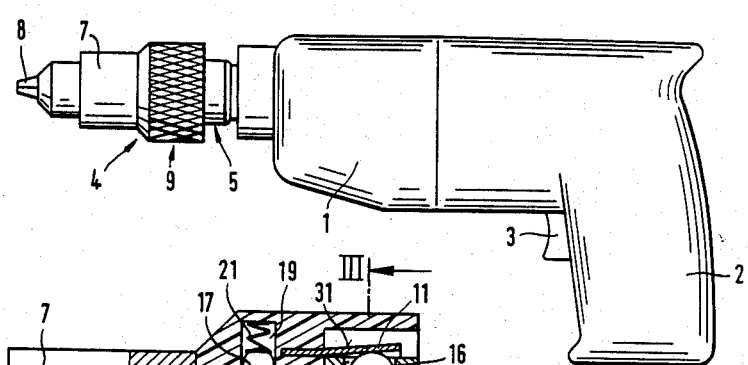
FIG. 1 is a side elevational view of a hand-held tool with a tool bit chuck embodying the present invention.
Figure 4:
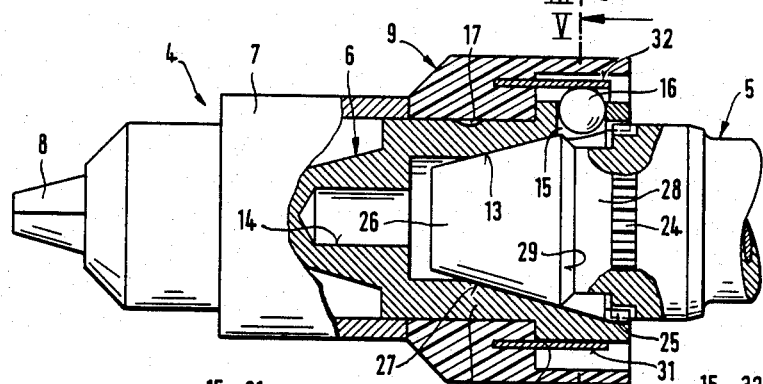
FIG. 4 is a view similar to FIG. 2, however, illustrating the chuck released from the rotary spindle.

In FIG. 1, a hand-held tool is shown comprising a housing 1 having a front end located on the left and a rear end on the right. A handle 2 extends downwardly from the rear end of the housing. A trigger-like switch 3 is located in the handle 2 for switching on and off the hand-held tool. A chuck 4 is located at the front end of the housing 1 detachably connected to a rotary spindle 5 extending in the front end—rear end direction of the housing with the front end of the spindle projecting axially from the front end of the housing. In the following description and in the claims, the front end and rear end of certain parts of the invention are mentioned with the front end being the left-hand end in FIGS. 1, 2 and 4 and the rear end being the right-hand end. The rotary spindle 5 has an axis of rotation extending in the front end-rear end direction.

Figure 2:
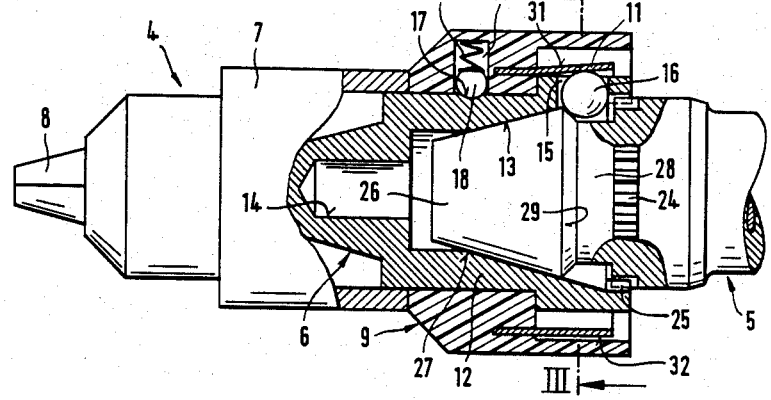
FIG. 2 is an enlarged view, partially in section, of the chuck shown in FIG. 1 clamped to a rotary spindle in the tool.
Figure 3:
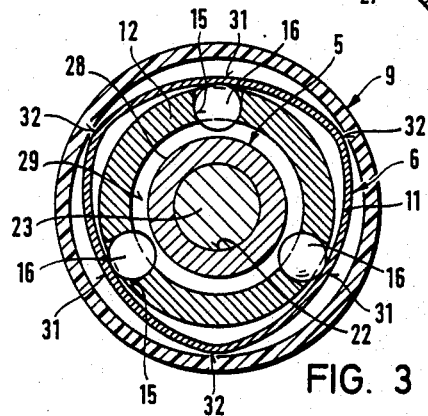
FIG. 3 is a sectional view taken along the line III—III in FIG. 2.

Chuck 4, shown on an enlarged scale in FIG. 2, includes an axially extending chuck part 6 at the rear end. An adjusting sleeve 7 for clamping jaws 8 is located between the front end and rear end of the chuck with the clamping jaws projecting axially at the front end of the chuck. A gripping sleeve 9 encircles the rear part of the chuck extending around the chuck part 6. An annular sleeve 11 is fixed at its front end within the gripping sleeve 9 and extends rearwardly around the rear end of the chuck part 6. Chuck part 6 includes an axially extending socket-shape section 12 forming a conically-shaped bore 13 with the bore being open toward the rotary spindle 5. A blind stepped cylindrical bore 14 extends from the front end of the conically-shaped bore 13 toward the front end of the chuck. At its rear end, the socket-shaped section 12 has three through openings 15 extending into the rear end of the bore 13. As can be seen in FIG. 3, the openings 15 are equiangularly spaced apart in the circumferential direction of the chuck part 6. A locking member or ball 16 is located in each of the openings 15. The radially outer surfaces of the balls 16 bear against the axially extending rear section of the annular spring 11.

In the direction toward the front end of the chuck 4, the chuck part 6 has snap-in depressions 17 in its outer surface for the engagement of a spherical snap-in member 18 so that the gripping sleeve 9 can be secured against rotation relative to the chuck part 6. The snap-in member 18 is supported in a tranversely extending blind bore 19 extending outwardly from the inner surface of the gripping sleeve 9 and a compression spring 21 is located within the bore and biases the member 18 radially inwardly. Rotary spindle 5 has an axially extending central bore 22, note FIGS. 3 and 5, containing a percussion transmission set 23. For the transmission of rotational movement, a set of axially extending splines 24 are located in the outside surface of the spindle at the rear end of the gripping sleeve 9 and the splines interengage with a matching set of corresponding splines 25 formed at the inside surface of the chuck part 6 at its rear end. The axially extending front end part 26 of the rotary spindle 5 forms a conically-shaped shaft section 27 having a cone angle corresponding to the cone angle of the conical bore 13. The conically-shaped shaft section 27 is bounded at its rear end by a circumferentially extending annular groove 28. The groove 28 has an opening in the surface of the spindle and a base spaced inwardly from the outer surface. The axially extending dimension of the groove 28 is greater at the opening than at the base and the reduced axial length of the base is effected by the slope of the flank 29 located closer to the front end of the spindle. When the conically-shaped shaft section 27 of the spindle 5 is inserted into the conically-shaped bore 13, the locking members or balls 16 under the action of the prestressed annular spring 11 abut against the flank 29 and are spaced outwardly from the base of the groove so that a backlash-free clamping of the shaft section 27 in the bore 13 is obtained.

Figure 5:
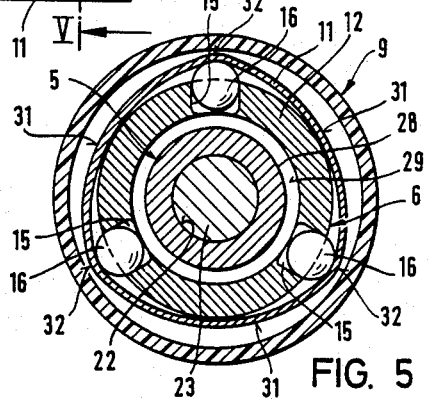
FIG. 5 is a sectional view taken along the line V—V in FIG. 4.

As can be seen in FIGS. 3 and 5, the annular spring 11 has a polygon shape. Sides 31 of the spring are curved outwardly under prestress and contact the outer surfaces of the socket-shaped section 12 pressing the balls 16 radially inwardly into the annular groove 28 in the rotational position of the spring as shown in FIGS. 2 and 3. As can be seen in FIGS. 3 and 5, the annular spring is in the form of an equilateral triangle made up of three arc-sides 31 with three corners 32 spaced radially outwardly from the outside surface of the socket-shaped section 12. When the spring 11 is moved from the position in FIGS. 2 and 3 into the position in FIGS. 4 and 5, the corners 32 move into alignment with the balls 16, and the balls can move radially outwardly out of the annular groove 28 into contact with the corners. In this rotated position of the annular spring achieved by rotating the gripping sleeve 9 relative to the chuck 4, the chuck can be pulled in the axial direction off the shaft-shaped section 27 of the spindle 5 without any significant force and without the use of any additional tool and it also can be moved in the opposite direction onto the front end of the rotary spindle 5. When the clamp is inserted onto the front end of the spindle, the chuck can be clamped by rotating the gripping sleeve 9 and the spring 11 through 60° back to the position shown in FIGS. 2 and 3.

In FIGS. 6-8, a chuck 41 is shown suitable for rotary and percussion operation. Chuck 41 is positioned on the front end of a rotary spindle 42.

Chuck 41 includes a chuck part 43 with a gripping sleeve 44 located on an axially extending section of the rear end of the chuck part. Chuck part 43 has a axially extending cylindrical bore 45, and a portion of the bore at the front end of the rotary spindle 42 has a axially extending conically-shaped section 46 for engagement with a correspondingly-shaped axially extending surface on the front end of the rotating spindle 42. Accordingly, for backlash-free centered engagement, the front end of the rotating spindle 42 has a conically-shaped shaft section 47.

A percussion transmittal set 48 extends axially through the hollow rotating spindle of 42, and provides rotational motion to the rotary spindle and also affords percussive force to a tool bit 49 positioned within the axially extending bore 45 in the chuck part 43.

The rotatable percussion transmittal set 48 has axially extending entrainment grooves 51 in its outer surface in which axially extending roller-shaped locking members 52 are positioned. The locking members 52 are supported, radially outwardly of the set 48, in through openings 53, in the rotary spindle 42. Accordingly, the locking members 52, held in the engaged position by a rotatable support ring 54, transmit the rotational motion from the set 48 to the rotary spindle 42.

An axially extending section of the rotary spindle 42 engaged in the chuck part 43 has a circumferentially extending annular groove 55 with the base of the groove being axially shorter than the opening into the groove in the outer surface of the spindle. The reduced axial extent of the groove at its base is implemented by the slope of the groove flank 56 located closer to the front end of the spindle. Depressions 57 located diametrically opposite one another are machined into the outer surface of the rotary spindle between the annular groove 55 and the front end of the spindle. The depressions 57 extend in the axial direction of the spindle 42.

Chuck part 43 has an axially extending sleeve-shaped section 58 in which an axial extending section of the front end of the rotary spindle 42 is received. The section 58 has bores 59 extending transversely of the axial direction of the spindle. A ball 61 is displaceably supported in each of the bores 59 and is biased by a cup spring package 62 in the radially inward direction. Radially outwardly, the cup spring package 62 is in abutment with a sliding shoe 63 with the radially outer surface of the shoe located adjacent the inner surface 64 of the gripping sleeve 44. In the position shown in FIGS. 6 and 7, the cup spring package 62 is stressed and presses the ball 61 radially inwardly against the flank 66 within the annular groove 55. This interconnection affords a backlash-free clamping of the shaft section 47 of the spindle 42 in the conically-shaped surface 46 of the chuck part 43.

Axially extending roller-shaped locking members 65 engage in the depressions 57 in the radially outer surface of the rotary spindle 42, and are supported within openings 66 in the chuck part 43 so that the locking members are radially displaceable. Locking members 65 bear radially outwardly against the inside surface of the gripping sleeve 44. Circlips 67, 68 are located in the inner surface of the gripping sleeve 44 and in the outer surface of the rotary spindle 42, respectively, and prevent the axial displacement of the gripping sleeve 44 and the support ring 54.

Stop ring 69 is threaded onto the axially extending front end region of chuck part 43. An elastic ring 71 is located within the front end of the chuck part 43 for providing a sealing action about the tool bit 49. A feed cuff 72 is displaceably supported on the chuck part 43. Feed cuff 72 laterally and axially encircles the chuck part. A cylindrical spring 73 encircles the chuck part 43 and biases the feed cuff 72 against a stop ring 69 located at the front end of the chuck 41. Another elastic ring 74 is located between the feed cuff 72 and the chuck part 43 and dampens the impact blow of the feed cuff. Roller-shaped locking members 76 are supported in openings 75 extending through an axially extending front portion of the chuck part 43 and the locking members are radially displaceable. Locking members 76 can be shifted into axially extending entrainment grooves 77 in the surface of the tool bit 49 for retaining the tool bit and transmitting rotational movement to it. The inside surface 78 of the feed cuff 72 opposite the locking members 76 as viewed in FIG. 6, projects radially inwardly relative to the inside surface at the front end of the feed cuff. The surface 78 holds the locking members 76 in the grooves 77 in the tool bit. To disengage the locking members 76, the feed cuff is displaced in the axial direction toward the rear end of the tool against the force of spring 73 so that the locking members 76 reach the increased diameter section at the front end of the feed cuff so that the locking members 76 can move radially outwardly releasing the tool bit for removal from the chuck 41.

FIGS. 7 and 8 show the cooperating relationship of the gripping sleeve 44 with the cup spring packages 62. The radially inner surface 64 of the gripping sleeve 44 has a control depression 79 extending in the circumferential direction around the axis of the spindle and at one end the depressions have an increased depth section 81 for releasing the cup-shaped packages so that they no longer bias the balls radially inwardly and affording disengagement of the balls 61 out of the grooves 55. In the position of the depression 79 shown in FIG. 7, the increased depth section 81 is located out of alignment with the shoes 63, accordingly, the cup spring packages are pressed inwardly and hold the balls 61 in the annular groove 55. By rotating the gripping sleeve 44 in the clock-wise direction, as viewed in FIGS. 7 and 8, the increased depth sections 81 in the depressions 79 are aligned in the radial direction with the sliding shoes 63, note FIG. 8, releasing the balls 61 from engagement with the annular groove 55.

Accordingly, the chuck 43 can be removed from the front end of the spindle 42.

While specific embodiments of the invention have been shown and described in detail to illustrate the application of the inventive principles, it will be understood that the invention may be embodied otherwise without departing from such principles.

We claim:

1. Hand-held tool for use as a power drill, a hammer drill, a powered screwdriver and the like, comprising a housing having a front end and a rear end, a rotary spindle located within said housing and having a front end and a rear end and an axis of rotation extending in the front end—rear end direction with said front end of said spindle projecting from the front end of said housing, a chuck arranged to hold a drill bit detachably on an axially extending front end part of said spindle and projecting in the axis of rotation direction of said spindle from the front end thereof, said chuck includes a chuck part fitted on the front end part of said spindle and having an axially extending chuck section connected to the front end part of said spindle, said chuck section being rotatably lockable with said spindle wherein the improvement comprises that said chuck section and front end part have corresponding axially extending conically-shaped surfaces engageable with one another, said conically-shaped surfaces comprise a conically-shaped shaft section on one of said spindle and said shaft section and means forming a conically-shaped bore on the other one, said spindle having an outer surface and comprises a recess formed as a circumferentially extending annular groove extending in the axis of rotation direction on said outer surface and said recess having an opening in the outer surface and a base inwardly of said opening with said base being shorter in the axis of rotation direction of said spindle than the opening, said recess having a flank closer to the front end of said spindle inclined from the opening of said recess to the base thereof in the direction towards the rear end of said spindle, a clamping member supported in a radially extending through opening of said chuck section and said clamping member extends into said recess in said spindle in abutment with said flank, a spring member in engagement with said clamping member for displacing said clamping member into engagement with said recess in said spindle, means in contact with said spring member for displacing said clamping member into and out of engagement with said recess, and the dimension of said clamping member within said recess in the axis of rotation direction corresponding at most to the least dimension in the axis of rotation direction of the opening in said recess.

2. Hand-held tool, as set forth in claim 1, wherein said clamping member is a ball.

3. Hand-held tool, as set forth in claim 1, wherein the clamping member is a ball.

4. Hand-held tool, as set forth in claim 1, wherein said spring is an annular spring encircling the axis of rotation and acting on said clamping member.

5. Hand-held tool, as set forth in claim 4, wherein said annular spring is polygonally shaped.

6. Hand-held tool, as set forth in claim 1, wherein said spring is a cup spring package.

7. Hand-held tool, as set forth in claim 1, wherein said means for displacing said clamping member is a gripping sleeve located around said chuck section and being rotatable relative to said chuck section.

8. Hand-held tool, as set forth in claim 7, wherein said gripping sleeve has a radially inner surface with a depression located therein extending in the circumferential direction with one end of said depression being deeper than the other end for affording control of the radial displacement of said spring.

9. Hand-held tool, as set forth in claim 1, wherein said chuck section is a socket-shaped section forming a conically-shaped bore for receiving the conically-shaped shaft section formed on said spindle.

10. Hand-held tool, as set forth in claim 1, wherein said chuck section is a sleeve-shaped section having the conically-shaped bore therein for receiving the conically-shaped shaft section on said spindle.

* * * * *